Oct. 11, 1949.    W. LANGE ET AL    2,484,040
PREPARATION OF CAROTENE CONCENTRATE
Filed May 22, 1948
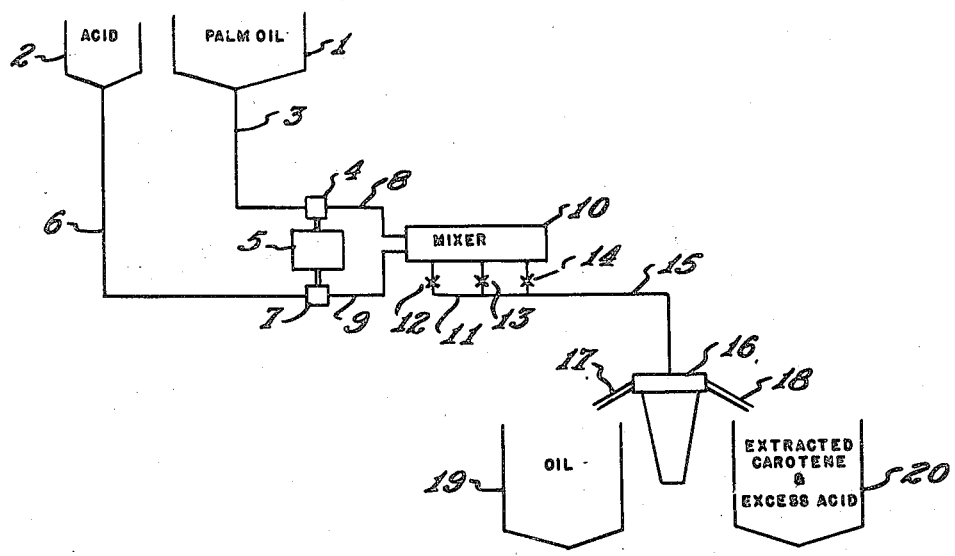
INVENTORS.
WILLY LANGE
AND ROBERT G. FOLZENLOGEN.
BY
Allen & Allen
ATTORNEYS.

Patented Oct. 11, 1949

2,484,040

UNITED STATES PATENT OFFICE 2,484,040

PREPARATION OF CAROTENE CONCENTRATE

Willy Lange, Cincinnati, and Robert G. Folzenlogen, Columbia Township, Hamilton County, Ohio, assignors to The Procter & Gamble Company, Cincinnati, Ohio, a corporation of Ohio Application May 22, 1948, Serial No. 28,696

12 Claims. (Cl. 260—666)

This invention relates to the recovery of a carotene concentrate from palm oil.

An object of the invention is to provide a new process for recovering a carotene concentrate from palm oil.

A further object is to provide a continuous process for the recovery of a carotene concentrate from palm oil.

These and other objects, and means for the achievement thereof, will be clearly understood from the following description and accompanying drawing referred to in detail below.

As more fully hereinafter described we have discovered that carotene contained in palm oil may be reacted with strong acids of high concentration such as, for example, sulfuric acid, perchloric acid and fluorosulfonic acid, to form salts which are precipitated as microcrystalline compounds or are dissolved in the excess acid used during the treatment, and that separation of the phase rich in carotene salts, followed by hydrolysis of the carotene salts and recovery of the liberated carotene-rich oily phase, provides a simple and efficient process for producing a carotene concentrate suitable for use in fortifying substances with pro-vitamin A.

The process of our invention involves intimately mixing for a brief period crude or refined palm oil in liquid condition with at least one inorganic acid of the group consisting of sulfuric, perchloric, fluorosulfonic, monofluorophosphoric and difluorophosphoric whereby carotene in the form of salts is precipitated or extracted from the oil; promptly separating the carotene-rich fraction from the oil; promptly arresting the action of the acid in the carotene-rich fraction by dilution, neutralization, or other means; hydrolyzing the salts; and recovering the carotene therefrom in the form of a concentrate.

The effect of the acid during treatment may be determined with the aid of a spectrophotometer. In the examination of palm oil with this instrument, for example, a maximum absorption of light will occur in the neighborhood of 450–460 millimicrons (m$\mu$) wave length. This maximum is associated with the carotene content and measurements of the intensity of the light transmitted at maximum absorption may be used as a measurement of the quantity of carotene present in the oil. The customary way of expressing the measurement of such carotene content is by the absorption coefficient $\alpha$. This coefficient is calculated from values determined as follows.

A solution of palm oil in benzene is first prepared. The concentration is from about 2 to about 6 gms. per liter of solution, depending on the carotene content of the oil. A portion of this solution is then placed in a standard glass cell which is inserted in the spectrophotometer. A measurement is made of the intensity of light transmitted through the cell at the wave length at which maximum absorption occurs. A similar measurement is made at the same wave length on a similar cell of the benzene alone. From the values obtained the absorption coefficient $\alpha$ may be calculated, the following formula being employed.

$$\alpha = \frac{\log \frac{I_o}{I_x}}{c \cdot x}$$

where $I_x$=the intensity of light transmitted by the cell of palm oil in benzene solution at the wave length of maximum absorption,
$I_o$=the intensity of light transmitted by the cell of benzene alone at the same wave length.
$c$=the concentration of oil in grams per liter of benzene solution, and
$x$=thickness of the absorption cell in centimeters.

Absorption spectra obtained by examination of recovered carotene as above indicated show that under the influence of the strong acids isomerization of the carotene takes place almost instantaneously with acid contact. This isomerization does not change either the character of the pigment-like properties or the essential chemical properties of the carotene. It merely results in shifting the wave length a few millimicrons at which maximum absorption occurs, and in changing the absorption intensity slightly.

However, a very undesirable reaction may take place as a result of the action of the excess acid on the carotene during contact, and that is the actual destruction of carotene. The carotene salts as such are quite stable but they decompose rapidly in the presence of the free or excess acid employed to accomplish optimum removal of the carotene. Products resulting from such destruction do not show the characteristics of carotene. It is therefore obvious that time of contact of acid with extracted and precipitated carotene should be held to a minimum to achieve maximum efficiency of carotene removal and preservation.

Our investigations of the decomposition rate of carotene in the presence of strong acid at about room temperature (75° F.) have indicated that the rate of destruction is very high during the initial period of contact but that it becomes lower with increase in time of contact. According to our observations about 50 per cent of the total carotene is destroyed by contact times of the order of 5 minutes. Accordingly we prefer to conduct the process under conditions in which acid treatment, separation of the carotene-rich phase, and arresting of the action of the acid are conducted in a period of time not substantially more than 5 minutes. Less than 30 per cent destruction is noted with the use of contact times of 2 minutes or under and accordingly we prefer to operate under these conditions. With adequate mixing the time of acid treatment may be reduced to a period of 30 seconds or less. In this period the bulk of the carotene is extracted from the oil and is present as a salt partly in crystallized form and partly dissolved in the acid phase of the oil-acid mixture.

The destruction of carotene also increases with increase in temperature of treatment. Thus temperatures not substantially higher than the complete melting point of palm oil (about 110° F.) are preferably employed. However, it is essential (for purposes of adequate mixing) that the palm oil be completely molten during the acid treatment. Temperatures of treatment lower than the melting point of the palm oil are of course feasible if the oil is dissolved in a suitable fat solvent, i. e. one that is volatile, inert to acid and alkali, and non-miscible with water. The use of a fat solvent also reduces the viscosity of the oil and makes possible rapid, intimate contact of the acid with the carotenes contained in the oil and aids in the separation of the oil and acid phases, thereby enabling reduction in time of contact. Oxygen-free, volatilizable fat solvents such as the following may be used:—benzene, chlorbenzene, toluene, petroleum ether, chloroform, hexane, pentane, heptane, cyclohexane and commercial hydrocarbon solvent mixtures which may include 2-methyl pentane, 2,3-dimethyl pentane, 2,2-dimethyl pentane, 2-methyl butane, 2,3-dimethyl butane, 2,2-dimethyl butane. Numerous other oil solvents of suitable nature and familiar to those versed in the art may be employed without departing from the invention. Although a solvent may be employed, the sequence of steps is substantially the same as that previously described. However, recovery of the solvent by distillation is preferably ultimately effected.

In view of the limited permissible contact time as above indicated, the process becomes well adapted for continuous operation, and in the accompanying drawing is illustrated diagrammatically a system for conducting the instant invention in a continuous manner. It is to be understood, however, that batch operation may also be successfully practiced, provided the precautions regarding temperature and time of treatment are observed as more fully outlined herein.

Tanks 1 and 2 contain respectively supplies of molten palm oil and acid. The palm oil is continuously conducted from tank 1 through pipe 3 to oil measuring device 4 (such as a pump) of a proportioning apparatus generally indicated at 5. Similarly, pipe 6 continuously conducts acid from supply tank 2 to acid measuring device 7 of proportioning apparatus 5. Pipes 8 and 9 conduct the continuously flowing streams of palm oil and acid respectively to a mechanical mixer 10 wherein intimate contact between acid and oil is effected. The size of the mixer is preferably such as to provide the desired time of contact at the rate of operation for which the apparatus is designed. A suitable mixer of variable capacity may of course be provided, having a manifold 11 and valves 12, 13 and 14 operable as is known so as to by-pass certain sections of the mixer and thereby give desired mixing capacity.

From the mixer the oil and acid sludge containing the carotene salts are delivered through pipe 15 to centrifuge 16 in which separation is effected. Outlets 17 and 18 carry away respectively the oil and acid sludge effluents which are deposited in tanks 19 and 20 respectively. During operation tanks 19 and 20 preferably contain water or are provided with means for the addition of water during operation so that the acid of the sludge phase and any residual acid contained in the oil phase may be reduced to a concentration below 50 per cent, for example, thereby rendering the same relatively inactive toward the oil and carotene salt. Some hydrolysis of the carotene salt may occur at this stage depending on the degree of dilution.

The oil and water are discharged from tank 19, the oil phase being delivered to an apparatus, not shown, wherein any residual acid may be washed out or neutralized with caustic soda or caustic potash, or other alkaline material.

The contents of tank 20, including the diluted acid sludge and any entrained palm oil, is subsequently neutralized either by water washing or by neutralization with an alkaline material such as caustic soda whereby hydrolysis of the carotene salts is completed. The carotene is liberated and becomes concentrated in the oily phase. This oily phase, as indicated above, may be extracted from the aqueous phase with an oil solvent such as benzene, petroleum ether, hexane, etc. which may be later distilled from the solution to leave the carotene concentrate.

The following discussion and examples will more clearly point out the manner in which the invention may be practiced.

The acids suitable for use in carrying out the invention must be not only concentrated but also strong in the sense of degree of acidity. Acids having high acidity such as sulfuric, perchloric, fluorosulfonic, monofluorophosphoric, and difluorophosphoric are suitable. The concentration of the acid in the treatment solution should be not substantially less than 70 per cent and sufficient to form salts with the carotene. Nitric, hydrochloric, and phosphoric acids, for example, are not suitable for the precipitation of the carotene salts because their acidity is insufficient to effect salt formation even at high concentrations. In general, the acids which we have found operative in the practice of the invention have the general formula $$(HO)_m(F)_nX(O)_p$$

where

X is selected from the group consisting of phosphorus of valence 5, sulfur of valence 6 and chlorine of valence 7,
$m$ is 1 or 2,
$n$ is 0, 1, or 2,
$p$ is 1, 2, or 3, the sum of $m$, $n$ and $p$ being 4 and the sum of $m$, $n$ and $2p$ being equal to the valence of X.

According to the above formula, sulfuric acid may be designated as $(HO)_2SO_2$, perchloric acid as $(HO)ClO_3$, fluorosulfonic acid as $(HO)FSO_2$, monofluorophosphoric acid as $(HO)_2FPO$ and difluorophosphoric acid as $(HO)F_2PO$.

The acid treatment may be carried out either by vigorously stirring the oil with the acid or by spraying the acid and oil together in the form of mists, or by any other means which will bring about a thorough and intimate contact of the acid with the palm oil thus enabling the acid to extract carotene from the oil.

The quantity of acid and its concentration may vary. As much as 5 per cent acid based on the weight of the oil may be employed, but, in order to reduce to a minimum side reactions such as the destruction of the carotene, it is advantageous to use an amount sufficient to precipitate the carotene but not substantially more than one per cent by weight.

Sulfuric and perchloric acids should not be substantially less than 70 per cent concentration, otherwise the water of the solution will inhibit the formation of carotene salts. Sulfuric acid is preferably used in its normal concentrated form of 76 to 100 per cent, and perchloric acid in the commercial concentration of 70 per cent has been found acceptable.

Fluorosulfonic acid and the fluorophosphoric acids tend to hydrolyze if appreciable water is present and therefore these acids are preferably used in their anhydrous or near anhydrous form.

The anhydrous fluorophosphoric acids are preferred because while they have sufficient acidity to form salts with the carotene, they are somewhat weaker than perchloric or sulfuric acid and thus show less tendency to react chemically with the triglyceride to form emulsifiers which tend to effect emulsification of the acid and carotene salt with the oil. In addition, since the anhydrous fluorophosphoric acids are non-oxidizing in character, their use, as compared with the use of sulfuric acid or fluorosulfonic acid, results in less darkening of the oil.

The acids may be used not only as such, but also absorbed on an inert pulverulent carrier, preferably of an absorbent nature, like diatomaceous earth. Such pulverulent materials should be substantially inert chemically towards acids or fatty materials and they may or may not have bleaching properties toward fatty materials. For instance kieselguhr, bleaching carbon, inactive carbon, fuller's earth and other siliceous minerals are suitable for use in our process. Powdered solids which have been previously acid treated are preferred because thereby the tendency toward further reaction with impregnating acid is eliminated or greatly diminished. Before such pulverulent materials are used they are preferably calcined to remove moisture thereby avoiding dilution of the acid to an undesirable degree. A preferred method of mixing the acid with the pulverulent material involves spraying the acid thereon during agitation. Difficulties in lump formation may thereby be avoided.

Separation of the oil from the precipitated and extracted carotene salt should be accomplished promptly after treatment, as by centrifuging, or, preferably by filtration in the event the acid treatment has been carried out in the presence of a pulverulent material. The acid sludge fraction obtained by centrifuging or the cake (pulverulent material plus carotene salts, excess acid, and entrained palm oil) obtained by filtration is then promptly suspended in water or alkaline solution so as to inactivate the acid or reduce its concentration preferably below about 50 per cent thereby reducing the tendency toward carotene destruction. This treatment also effects hydrolysis of the salts and liberates the carotene which becomes concentrated in the oily phase. The mixture is washed with water until neutral or is carefully neutralized with an alkaline material. The oily phase, comprising carotene and any entrained palm oil is then extracted with a suitable fat solvent which is subsequently removed by distillation, the carotene being recovered in the residue.

The oil fraction from which the carotene has been removed is preferably diverted to soap manufacture, but, to reduce deterioration to a minimum and facilitate storage and handling, the residual acid contained therein is preferably removed by water washing or careful neutralization promptly after separation from the carotene-rich fraction.

The described method results in the formation of a concentrate which may contain ten or more times as much carotene as the original oil per unit of weight.

The following examples indicate methods whereby the process may be conducted. It is to be understood, however, that details given are by way of illustration only and that the invention is not limited thereto but rather by the appended claims. In these specific examples the value of $a$ at the maximum is always given together with the wave length of the maximum in millimicrons. The palm oil used for these examples had an absorption coefficient $a$ at 458 m$\mu$ equal to 0.2184. In examples 1 to 4 the palm oil during treatment was in liquid condition at a temperature not substantially above its melting point.

*Example 1.*—Refined and filtered palm oil was agitated vigorously for 2 minutes with 2% of a powdery product consisting of equal parts of dry kieselguhr, and perchloric acid of 70% concentration. The mixture was filtered, 1 minute being required for separation. The oil, after alkali refining, had an $a$ of 0.0726 at 455 m$\mu$, indicating that only about 33% of the original carotene remained in the oil. The filter cake was promptly neutralized with aqueous sodium hydroxide and the fatty matter was extracted with benzene. The solvent was evaporated and 6.8% of a carotene concentrate (calculated on the basis of the original palm oil) was obtained. The concentrate had an $a$ of 1.314 at 452 m$\mu$ (a carotene concentration about 6 times that of the original palm oil) indicating that about 41% of the original carotene had been removed and recovered by the acid treatment.

*Example 2.*—Crude palm oil was agitated vigorously for one minute with 6% of a pulverulent material consisting of equal parts of a dry diatomaceous earth (kieselguhr) and sulfuric acid of 95.5% concentration. The mixture was promptly filtered after the agitation period, one minute being required to effect separation of the constituents. The oil, after having been washed with water until neutral to litmus paper, had an $a$ of 0.0533 at 458 m$\mu$, indicating that about 24.4% of the original carotene remained in the oil. On the basis of the original palm oil 4.6% of fatty matter was obtained from the residue of the filtration after prompt neutralization and extraction with petroleum ether. This recovered material had an $a$ of 2.444 at 455 m$\mu$, indicating that the carotene concentration was over 11 times that of the original palm oil and that about 51.5% of the original carotene had been removed and recovered as a concentrate.

*Example 3.*—Crude palm oil was agitated vigorously with 3% of commercial anhydrous difluorophosphoric acid for one minute. The mixture was centrifuged for 2 minutes. The separated oil phase was alkali refined promptly in the customary manner and showed an α of 0.0781 at 453 mμ corresponding to about 35.8% of the original carotene content of the palm oil. The separated acid sludge was also neutralized with NaOH solution promptly after centrifuging and then was extracted with petroleum ether. 3% of fatty matter (based on the original palm oil) was obtained having an α of 3.143 at 453 mμ, indicating that the carotene concentration was over 14 times that in the original palm oil and that about 43% of the original carotene had been recovered as a concentrate by the acid treatment.

It is to be noted that this example involves the use of anhydrous difluorophosphoric acid. The absence of water in the acid permitted exceptional rapid separation of acid sludge and oil. During the agitation period microscopic dark droplets of acid were distributed throughout the oil which itself seemed to have a light blue color free from any yellow shade which would have indicated the presence of free carotene.

A carotene concentrate may be similarly prepared by the use of anhydrous monofluorophosphoric acid instead of the difluorophosphoric acid used in this Example 3.

*Example 4.*—Palm oil was agitated vigorously with 1% of anhydrous fluorosulfonic acid for 30 seconds, then separated by centrifugation for 2 minutes. Both the oil and the acid sludge were alkali refined promptly after separation. The oil had an α of 0.0659 at 457 mμ corresponding to about 30% of the carotene in the original oil. From the sludge a carotene concentrate amounting to 6.2% based on the orginal oil was obtained by extraction with benzene and removal of the solvent. This material had an α of 1.408 at 454 mμ, indicating that the carotene concentration was about 6½ times that in the original palm oil and that about 40% of the original carotene had been recovered as a concentrate by the acid treatment.

*Example 5.*—Crude palm oil was dissolved in an equal volume of benzene and agitated vigorously at room temperature (75–80° F.) for 30 seconds with 6% by weight (based on the palm oil) of a powdery mixture consisting of equal parts by weight of dry fuller's earth and sulfuric acid of 95.5% concentration. Separation of the acid-earth mixture from the oil was effected promptly after the mixing period by filtration in 30 seconds. The oil after prompt neutralization with NaOH and removal of the solvent by distillation had an α of 0.0968 at 457 mμ indicating that about 44.5% of the original carotene remained in the oil. A carotene concentrate amounting to 3.4% of the original oil was recovered from the acid-earth mixture by prompt neutralization and subsequent solvent extraction with benzene. This material had an α of 2.984 at 453 mμ, indicating that the carotene concentration was almost 14 times that of the original palm oil and that about 46.5% of the original carotene had been recovered in the carotene concentrate.

Having thus described our invention, what we claim and desire to secure by Letters Patent is:

1. Process of producing carotene concentrate from palm oil which comprises adding to palm oil in liquid condition and intimately mixing therewith at least one acid of the group consisting of sulfuric acid, perchloric acid, fluorosulfonic acid, monofluorophosphoric acid, and difluorophosphoric acid, thereby causing separation of a carotene-rich phase from the oil phase, promptly separating the main body of the oil phase from the main body of the carotene-rich phase, promptly inactivating the acid in the carotene-rich phase and thereby liberating an oily phase rich in carotene, and separating said oily phase.

2. Process of claim 1 in which the acid concentration is not substantially less than 70 per cent and sufficient to form salts with carotene in the oil.

3. Process of claim 1 in which the time elapsing between addition of acid to the palm oil and the inactivation of the acid in the carotene-rich phase does not exceed 5 minutes.

4. Process of claim 1 in which the palm oil is dissolved in a volatile fat solvent which is immiscible with water and inert toward said acid.

5. Process of claim 1 in which the temperature of the oil is not substantially above its complete melting point.

6. Process of claim 1 in which the acid inactivation is effected by neutralization with an aqueous alkaline solution.

7. The process of claim 1 in which the acid is sulfuric acid and in which the amount employed does not exceed one per cent based on the weight of the oil.

8. The process of claim 1 in which the acid is anhydrous monofluorophosphoric acid and in which the amount thereof does not exceed one per cent based on the weight of the oil.

9. The process of claim 1 in which the acid is anhydrous difluorophosphoric acid and in which the amount employed does not substantially exceed one per cent based on the weight of the oil.

10. Process of claim 1 in which the palm oil is simultaneously treated with the acid and a substantially inert pulverulent material.

11. Process of claim 10 in which the acid is impregnated on the pulverulent material.

12. Process of producing carotene concentrate from palm oil, which comprises: bringing together continuously flowing streams of palm oil and at least one acid of the group consisting of sulfuric acid, perchloric acid, fluorosulfonic acid, monofluorophosphoric acid and difluorophosphoric acid, the concentration of said acid being not substantially less than 70 per cent and sufficient to form salts with the carotene, intimately mixing said palm oil and said acid for a brief period not substantially exceeding three minutes during said flow, thereby causing separation of carotene salts from the oil phase, promptly thereafter continuously and centrifugally separating carotene salts from the main body of the oil phase, promptly neutralizing separated carotene salts with an aqueous alkaline solution, thereby hydrolyzing said salts and liberating an oily phase rich in carotene, and separating said oily phase from the aqueous phase.

WILLY LANGE.
ROBERT G. FOLZENLOGEN.

REFERENCES CITED

The following references are of record in the file of this patent:

UNITED STATES PATENTS

| Number | Name | Date |
| --- | --- | --- |
| 1,978,981 | Barnett | Oct. 30, 1934 |